(12) United States Patent
Ohata

(10) Patent No.: US 7,742,236 B2
(45) Date of Patent: Jun. 22, 2010

(54) ZOOM LENS AND IMAGE PICKUP APPARATUS

(75) Inventor: Atsushi Ohata, Tokyo (JP)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 12/230,157

(22) Filed: Aug. 25, 2008

(65) Prior Publication Data

US 2009/0091843 A1 Apr. 9, 2009

(30) Foreign Application Priority Data

Oct. 4, 2007 (JP) ............................. 2007-260754

(51) Int. Cl.
*G02B 15/14* (2006.01)
(52) U.S. Cl. .................... 359/682; 359/695; 359/680
(58) Field of Classification Search ................ 359/680, 359/682, 689, 694, 695
See application file for complete search history.

(56) References Cited

U.S. PATENT DOCUMENTS 6,229,655 B1   5/2001   Kohno et al.
6,977,778 B2 * 12/2005 Nose et al. .................. 359/680
7,042,652 B2 *  5/2006 Nose et al. .................. 359/689
7,139,129 B2 * 11/2006 Nose et al. .................. 359/682
7,180,679 B2 *  2/2007 Nose et al. .................. 359/682
7,215,484 B2 *  5/2007 Yamashita et al. .......... 359/682

FOREIGN PATENT DOCUMENTS

JP        2000-267009        9/2000

* cited by examiner

*Primary Examiner*—David N Spector
(74) *Attorney, Agent, or Firm*—Rader, Fishman & Grauer PLLC

(57) ABSTRACT

A zoom lens includes, in order from an object side, a first lens group having a negative power, a second lens group having a positive power, and a third lens group having a positive power. At least the first and second lens groups are movable during a change from a wide-angle end state in which a focal length becomes shortest to a telephoto end state in which the focal length becomes longest. The first lens group is constructed of a glass lens and a plastic lens, the glass lens being positioned on the object side and having a negative power, the plastic lens being positioned on an image side and having a positive power. The second lens group includes a single plastic lens having a negative power. The third lens group includes at least one plastic lens having a positive power. The lenses are satisfied predetermined conditions.

4 Claims, 9 Drawing Sheets

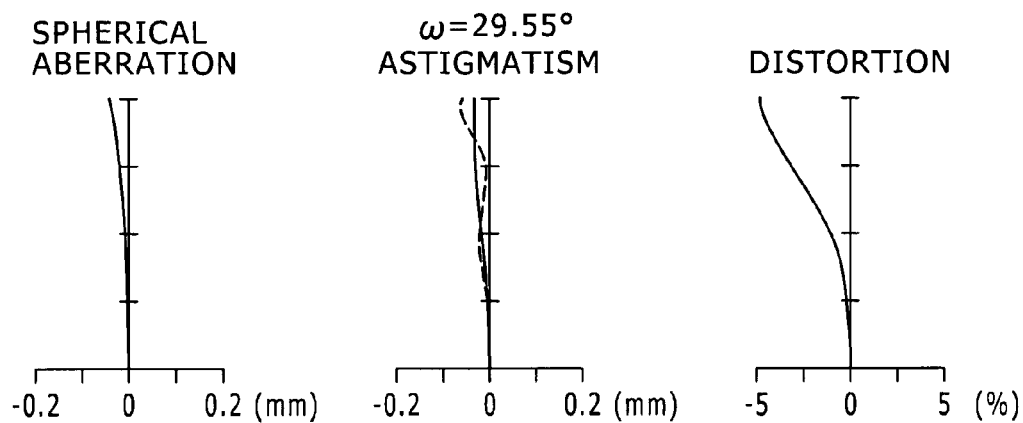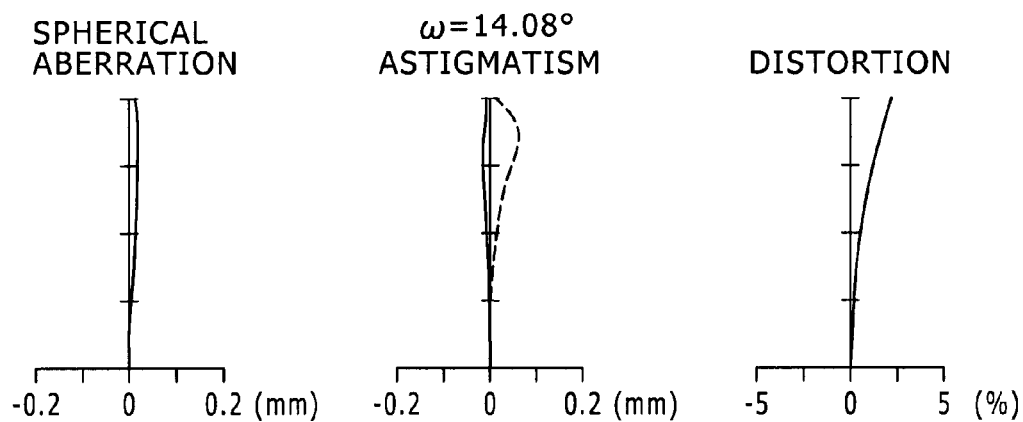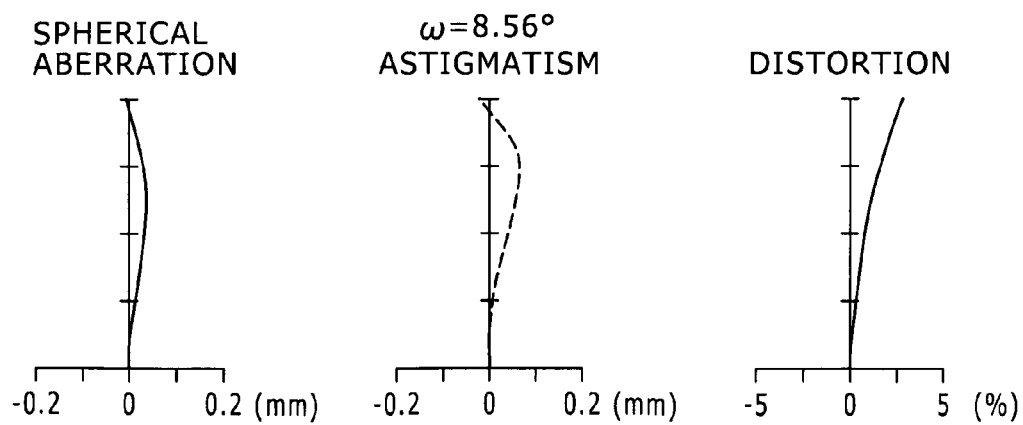

ZOOM LENS AND IMAGE PICKUP APPARATUS

CROSS-REFERENCE TO RELATED APPLICATIONS

The present application claims benefit of priority of Japanese patent Application No. 2007-260754 filed in the Japanese Patent Office on Oct. 4, 2007, the entire disclosure of which is incorporated herein by reference.

BACKGROUND OF THE INVENTION

1. Field of the Invention

The present invention relates to a zoom lens and an image pickup apparatus using the same. More particularly, the invention relates to a zoom lens used for digital video cameras, digital still cameras, and the like, and to an image pickup apparatus using the zoom lens.

2. Description of Related Art

In recent years, digital cameras using an imaging device, such as a Charge Coupled Device (CCD) and a Complementary Metal-Oxide Semiconductor (CMOS), in place of silver salt film, have rapidly widespread and become popular. As the digital cameras have become popular, user's needs for lower cost, miniaturization, and higher magnifying power of lens-incorporated digital cameras in particular are growing. In addition, the number of pixels in the imaging device tends to increase every year, increasing a need for higher image quality as well.

To meet these needs for lower cost and higher image quality, an optical system having a three-group lens with negative-positive-positive power arrangement in which each group includes a resin lens is disclosed in, for example, Japanese Unexamined Patent Application Publication No.2000-267009 (Patent Document 1).

SUMMARY OF THE INVENTION

However, in such an optical system disclosed in the Patent Document 1, the total optical length on a wide-angle side is longer compared with the size and zoom ratio of the imaging device. Thus, there are possibilities for higher magnifying power and further miniaturization.

Accordingly, it is desirable to provide a small-sized zoom lens having a high image quality and a high magnifying power at low cost, by effectively arranging plastic lenses having an appropriate power in the negative-positive-positive three-lens-group configuration, and an image pickup apparatus using the zoom lens.

In accordance with one embodiment of the present invention, there is provided a zoom lens including, in order from an object side, a first lens group having a negative power, a second lens group having a positive power, and a third lens group having a positive power. At least the first lens group and the second lens group are movable during a change from a wide-angle end state in which a focal length becomes shortest to a telephoto end state in which the focal length becomes longest. The first lens group is constructed of a glass lens and a plastic lens. The glass lens is positioned on the object side and has a negative power. The plastic lens is positioned on an image side and has a positive power. The second lens group includes a single plastic lens having a negative power. The third lens group includes at least one plastic lens having a positive power. The following conditional expressions (1), (2), (3), (4), (5), and (6) are satisfied:

$$\alpha > 2.5; \tag{1}$$

$$lw/(\alpha \cdot Y) < 4.5; \tag{2}$$

$$|\phi P1/\phi 1| \leq 0.55; \tag{3}$$

$$|\phi P2/\phi 2| \leq 0.3; \tag{4}$$

$$|\phi P1/\phi t| < 0.7; \text{ and} \tag{5}$$

$$|\phi P2/\phi t| < 0.4, \tag{6}$$

where

α is a zoom ratio (=focal length of a total system at a telephoto end/focal length of the total system at a wide-angle end);

φ1 is a power of the first lens group;

φP1 is a power of the plastic lens having positive power in the first lens group;

φ2 is a power of the second lens group;

φP2 is a power of the plastic lens having negative power in the second lens group;

φt is a power at the telephoto end of the total system;

lw is a total optical length at the wide-angle end; and

Y is a maximum image height.

In accordance with another embodiment of the present invention, there is provided an image pickup apparatus including the zoom lens according to the above-mentioned embodiment of the present invention, and an imaging device for converting an optical image formed by the zoom lens into an electrical signal.

According to embodiments of the present invention, a small-sized zoom lens having high image quality and high magnifying power, and an image pickup apparatus using the zoom lens can be provided at low cost.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 2 shows a spherical aberration, an astigmatism, and a distortion measured during a wide-angle end state;

FIG. 6 shows a spherical aberration, an astigmatism, and a distortion measured during the wide-angle end state;

FIG. 10 shows a spherical aberration, an astigmatism, and a distortion measured during the wide-angle end state;

FIG. 14 is a graph showing, along with FIGS. 15 and 16, various aberrations of a numerical example 4 obtained by applying specific values to the fourth embodiment, and FIG. 14 shows a spherical aberration, an astigmatism, and a distortion measured during the wide-angle end state;

FIG. 15 is a graph showing a spherical aberration, an astigmatism, and a distortion measured during the intermediate focal length state;

FIG. 16 is a graph showing a spherical aberration, an astigmatism, and a distortion measured during the telephoto end state.

DETAILED DESCRIPTION OF EMBODIMENTS

Figure 1:
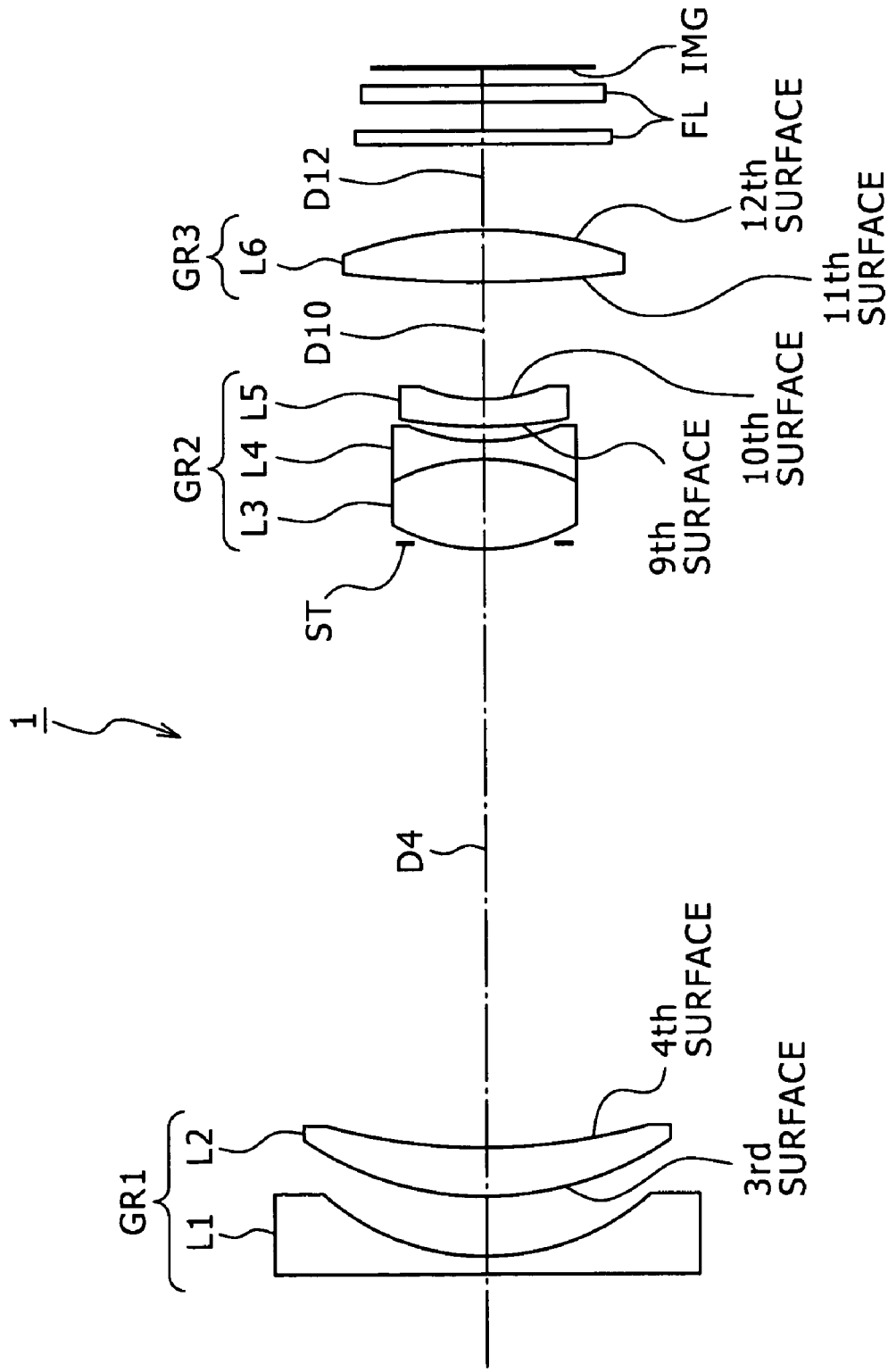
FIG. 1 is a diagram showing the lens construction of a zoom lens according to a first embodiment of the present invention.

Embodiments for implementing a zoom lens and an image pickup apparatus according to one embodiment of the present invention will be described with reference to the drawings.

First, the zoom lens according to an embodiment of the present invention will be described.

The zoom lens is constructed by arranging, in order from an object side, a first lens group having a negative power, a second lens group having a positive power, and a third lens group having a positive power. At least the first lens group and the second lens group are movable during a change from a wide-angle end state in which a focal length becomes shortest to a telephoto end state in which the focal length becomes longest. The first lens group is constructed of a glass lens having a negative power and a plastic lens having a positive power. The second lens group includes a single plastic lens having a negative power. The third lens group includes at least one plastic lens having a positive power. The following conditional expressions (1), (2), (3), (4), (5), and (6) are satisfied:

$$\alpha > 2.5; \quad (1)$$

$$lw/(\alpha \cdot Y) < 4.5; \quad (2)$$

$$|\phi P1/\phi 1| \leq 0.55; \quad (3)$$

$$|\phi P2/\phi 2| \leq 0.3; \quad (4)$$

$$|\phi P1/\phi t| < 0.7; \text{ and} \quad (5)$$

$$|\phi P2/\phi t| < 0.4, \quad (6)$$

where $\alpha$ is a zoom ratio (=focal length of a total system at a telephoto end/focal length of the total system at a wide-angle end);

$\phi 1$ is a power of the first lens group;

$\phi P1$ is a power of the plastic lens having a positive power in the first lens group;

$\phi 2$ is a power of the second lens group;

$\phi P2$ is a power of the plastic lens having a negative power in the second lens group;

$\phi t$ is a power at the telephoto end of a total system;

$lw$ is a total optical length at the wide-angle end; and $Y$ is a maximum image height.

By this construction, a small-sized zoom lens having high image quality and high magnifying power can be obtained at low cost.

The conditional expressions (1) and (2) are intended to define conditions for accomplishing miniaturization while maintaining a high magnifying power. If the conditional expression (2) is not satisfied, the total length of the image pickup apparatus is increased to cause upsizing even if the high magnifying power can be accomplished.

The conditional expressions (3) and (4) are intended to define conditions for suppressing sensitivity to relative decentration and improving assemblability by suppressing the power of a plastic lens in each lens group, and also for suppressing performance degradation due to changes in shape and refractive index of the plastic lens during temperature/humidity change. If tried to accomplish miniaturization and higher magnifying power without satisfying the conditional expressions (3) and (4), the power of the plastic lens becomes so strong that the sensitivity to the relative decentration within each lens group in which the plastic lens is positioned is increased, thereby impairing the assemblability and drastically aggravating the performance degradation during temperature/humidity change.

The conditional expressions (5) and (6) are intended to define conditions for providing an optical system with less performance degradation even during temperature/humidity change, by suppressing the power of the plastic lenses with respect to the total system. If the conditional expressions (5) and (6) are not satisfied, performance degradation during temperature/humidity change will be drastically aggravated, even if high zoom ratio can be ensured.

By constructing the first lens group to have two lenses and using a glass lens as a negative lens on the object side and a plastic lens as a positive lens on the image side, the plastic lens typically having a low refractive index can be arranged effectively in the first lens group having a negative power as a whole. Namely, by using a plastic lens as a positive lens of the first lens group, the power of the plastic lens can be suppressed compared with a case where a plastic lens is used as a negative lens, thereby suppressing the performance degradation during temperature/humidity change. Furthermore, by not using a plastic lens as the negative lens closest to the object side in the first lens group, but by using a plastic lens as the positive lens on the image side, the outer diameter of the plastic lens can be suppressed, thereby providing advantages that strength as a single lens product can be ensured and that the lens is easy to mold.

Furthermore, by using a plastic lens as the negative lens of the second lens group, the back focus fluctuations during temperature/humidity change and an amount of back focus fluctuations of the positive plastic lens of the first lens group can be cancelled out.

It is desirable that a zoom lens according to an embodiment of the present invention satisfy the following conditional expressions (7) and (8):

$$n1 < 1.62; \text{ and} \quad (7)$$

$$v1 > 55, \quad (8)$$

where n1 is a refractive index of the glass lens having a negative power in the first lens group; and v1 is an Abbe number of the glass lens having a negative power in the first lens group.

As a result of this construction, chromatic aberrations can be suppressed with the power of the plastic lens having a positive power in the first lens group suppressed, thereby suppressing the performance degradation during temperature/humidity change.

If the conditional expressions (7) and (8) are not satisfied, the power of the positive lens constituting the first lens group is increased in terms of correcting aberrations, thereby drastically aggravating the performance degradation during temperature/humidity change. In addition, the sensitivity is increased, thereby inviting disadvantages from the manufacturing viewpoint as well.

In the zoom lens according to an embodiment of the present invention, it is desirable that the second lens group include by positioning, in the following order from the object side, an aperture stop, a first lens being a glass lens having a positive power, a second lens being a glass lens having a positive power, a third lens being a glass lens having a negative power, and a fourth lens being a plastic lens having a negative power, and that the second lens and the third lens be cemented.

As a result, the positive power of the second lens group having a positive power as a whole is distributed to a positive glass lens and a positive cemented lens. Consequently, the sensitivity to the relative decentration can be suppressed, to have an advantage from the manufacturing viewpoint. Furthermore, by arranging the plastic lens having a negative power at a position distant from the aperture stop, the positions at which principal ones of peripheral rays pass through the plastic lens becomes far away from the optical axis. Accordingly, the plastic lens having an aspherical shape can correct effectively astigamatism or distortion, in particular.

Specific embodiments of the zoom lens according to embodiments of the present invention will be described below.

It is noted that the embodiments also include those having lens surfaces formed of aspherical surfaces. The aspherical surface is supposed to be defined by the following expression 1.

$$x = cy^2/(1 + (1-(1+\kappa)c^2y^2)^{1/2}) + Ay^4 + By^6 + \ldots \quad [\text{Expression 1}]$$

wherein "x" is the distance from the apex of a lens surface in the optical axis direction, "y" is the height in a direction perpendicular to the optical axis, "c" is the paraxial curvature, "κ" is the conic constant, and "A, B, . . . " are the aspherical coefficients.

FIG. 1 is a diagram showing the lens construction of a first embodiment 1 of the zoom lens according to an embodiment of the present invention. A zoom lens 1 is constructed by, in the following order from an object side, a first lens group GR1 having a negative power, a second lens group GR2 having a positive power, and a third lens group GR3 having a positive power. During zooming, all of the first to the third lens groups GR1 to GR3 are movable. On a wide-angle side (short focus), an interval between the first lens group GR1 and the second lens group GR2 is increased to decrease an interval between the second lens group and an imaging plane, thereby moving a principal point closer to the imaging plane and thus achieving the short focus. On the other hand, on a telephoto side (long focus), the interval between the first lens group GR1 and the second lens group GR2 is decreased to increase the interval between the second lens group and the imaging plane, thereby moving the principal point away from the imaging plane and thus achieving the long focus. Furthermore, by making the third lens group movable and by allowing the third lens group to absorb focal position variations at each angle of view, the high performance can be assured while miniaturization is achieved.

The first lens group GR1 includes by positioning, in the following order from the object side, a glass negative meniscus lens L1 having a concave surface facing an image side and a plastic positive meniscus lens L2 having a convex surface facing the object side and having both surfaces formed of aspherical surfaces. The second lens group GR2 includes by positioning, in the following order from the object side, an aperture stop ST, a cemented positive lens constructed of a biconvex glass positive lens L3 and a biconcave glass negative lens L4, and a plastic negative meniscus lens L5 having a convex surface facing the object side and having both surfaces formed of aspherical surfaces. The third lens group GR3 is constructed of a plastic positive meniscus lens L6 having a convex surface facing the image side and having both surfaces formed of aspherical surfaces. Furthermore, a filter FL such as a low-pass filter is disposed between the third lens group GR3 and an image plane IMG.

Table 1 shows F-numbers "FNO" and half-angles of view "ω" of a numerical example 1 in which specific values are applied to the zoom lens 1 according to the first embodiment, along with focal lengths "f".

TABLE 1

| | f | | |
|---|---|---|---|
| | 6.23 | 15.55 | 23.46 |
| FNO | 2.89 | 4.63 | 5.99 |
| ω | 30.03 | 13.04 | 8.72 |

Table 2 shows the data on each optical element constituting the zoom lens 1, in the numerical example 1. In tables showing data, "SURFACE NUMBER" denotes an i-th surface counted from the object side, "RADIUS OF CURVATURE" denotes a paraxial curvature radius of an i-th surface counted from the object side, "SURFACE INTERVAL" denotes an on-axis surface interval between the i-th surface and an (i+1)-th surface counted from the object side, "REFRACTIVE INDEX" denotes a refractive index, at d-line (wavelength=587.6 nm), of the i-th surface counted from the object side, and "ABBE NUMBER" denotes the Abbe number, at d-line, of the i-th surface counted from the object side.

TABLE 2

| SURFACE NUMBER | RADIUS OF CURVATURE | SURFACE INTERVAL | REFRACTIVE INDEX | ABBE NUMBER |
|---|---|---|---|---|
| 1 | 0.0000 | 0.600 | 1.64000 | 60.2 |
| 2 | 8.3743 | 2.114 | | |
| 3 | 10.2351 | 1.700 | 1.58300 | 29.2 |
| 4 | 17.0298 | 21.781 | | |
| APERTURE STOP | 0.0000 | −0.300 | | |
| 6 | 5.7428 | 3.200 | 1.83500 | 43.0 |
| 7 | −7.9234 | 0.644 | 1.74077 | 27.8 |

TABLE 2-continued

| SURFACE NUMBER | RADIUS OF CURVATURE | SURFACE INTERVAL | REFRACTIVE INDEX | ABBE NUMBER |
|---|---|---|---|---|
| 8 | 6.8460 | 0.600 | | |
| 9 | 9.2406 | 0.880 | 1.52470 | 56.2 |
| 10 | 8.0014 | 4.260 | | |
| 11 | −117.2816 | 1.650 | 1.52470 | 56.2 |
| 12 | −8.8175 | 3.187 | | |
| 13 | 0.0000 | 0.400 | 1.45847 | 67.8 |
| 14 | 0.0000 | 1.000 | | |
| 15 | 0.0000 | 0.500 | 1.56883 | 56.0 |
| 16 | 0.0000 | 0.600 | | |
| IMG | 0.0000 | 0.000 | | |

In the zoom lens 1, both surfaces (the 3rd and the 4th surfaces) of the plastic-formed positive meniscus lens L2 of the first lens group GR1, both surfaces (the 9th and the 10th surfaces) of the plastic-formed negative meniscus lens L5 of the second lens group GR2, and both surfaces (the 11th and the 12th surfaces) of the plastic positive meniscus lens L6 constituting the third lens group GR3 are formed of aspherical surfaces. The 4th-, 6th-, 8th-, and 10th-order aspherical coefficients A, B, C, and D of these surfaces in the numerical example 1 are shown in Table 3, along with conic constants "κ". In Table 3 and the following tables showing aspherical surfaces, "E−" is an exponential representation which is to base 10, i.e., "$10^{-i}$"; for example, "0.12345E−05" represents "$0.12345 \times 10^{-5}$".

TABLE 3

| SURFACE NUMBER | K | A | B | C | D |
|---|---|---|---|---|---|
| 3 | 0.00000E+00 | −6.820725E−05 | 5.825626E−06 | −2.076530E−07 | 9.011097E−10 |
| 4 | 0.00000E+00 | −1.545881E−04 | 5.491598E−06 | −2.786428E−07 | 2.253476E−09 |
| 9 | 0.00000E+00 | −3.501147E−03 | −1.108700E−04 | −3.292665E−06 | 4.690677E−07 |
| 10 | 0.00000E+00 | −1.019909E−03 | 7.744690E−05 | −1.638448E−05 | 2.678865E−06 |
| 11 | 0.00000E+00 | 1.136587E−03 | −6.524462E−05 | 5.476358E−06 | −1.664868E−07 |
| 12 | 0.00000E+00 | 1.825984E−03 | −5.782091E−05 | 4.618216E−06 | −1.558258E−07 |

In the zoom lens 1, a surface interval D4 between the first lens group GR1 and the second lens group GR2, a surface interval D10 between the second lens group GR2 and the third lens group GR3, and a surface interval D12 between the third lens group GR3 and the filter FL vary during zooming from the wide-angle end state to the telephoto end state. The values of the respective intervals in the numerical example 1 during the wide-angle end state (f=6.229), the intermediate focal length state (f=15.545), and the telephoto end state (f=23.464) are shown in Table 4.

TABLE 4

| | f | | |
|---|---|---|---|
| | 6.229 | 15.545 | 23.464 |
| D4 | 21.481 | 5.341 | 1.175 |
| D10 | 4.260 | 13.632 | 20.321 |
| D12 | 2.587 | 1.620 | 1.570 |

The values corresponding to the conditional expressions (1) through (8) of the numerical example 1 are shown in Table 5.

TABLE 5

| α | 3.8 |
|---|---|
| $|w/(\alpha \cdot Y)|$ | 3.16 |
| $|\phi P1/\phi 1|$ | 0.50 |
| $|\phi P2/\phi 2|$ | 0.08 |
| $|\phi P1/\phi t|$ | 0.59 |
| $|\phi P2/\phi t|$ | 0.16 |
| n1 | 1.64000 |
| ν1 | 60.2 |

Figure 2:
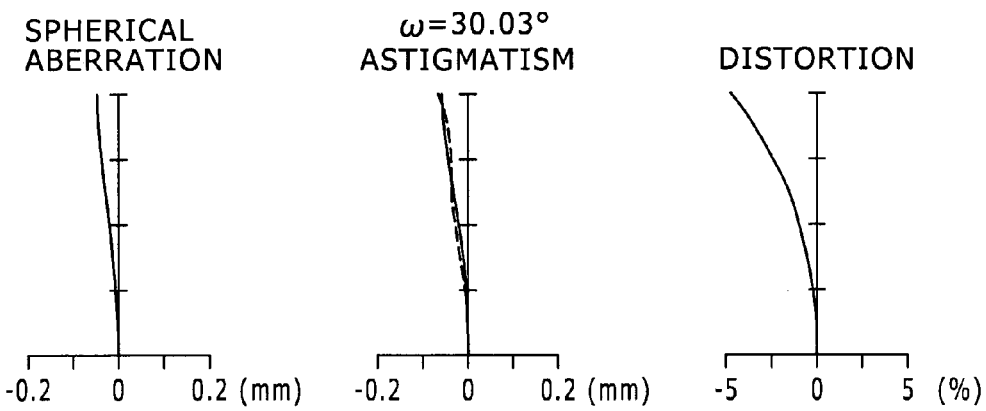
FIG. 2 is a graph showing, along with FIGS. 3 and 4, various aberrations of a numerical example 1 obtained by applying specific values to the first embodiment.
Figure 3:
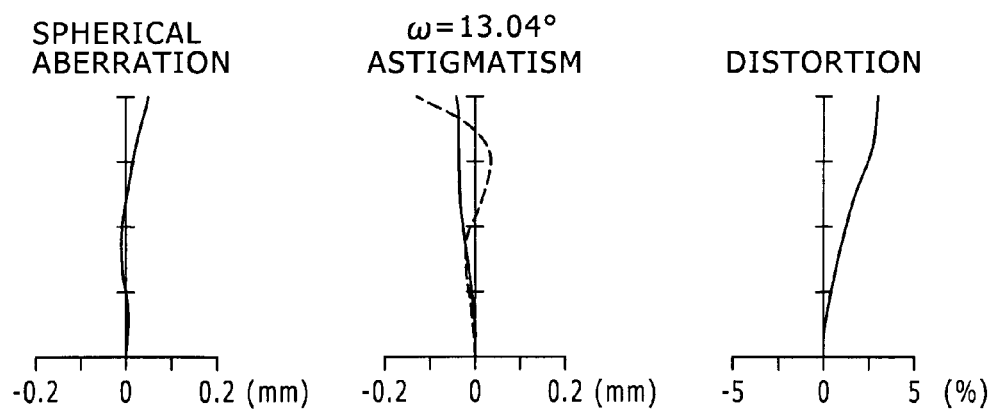
FIG. 3 is a graph showing a spherical aberration, an astigmatism, and a distortion measured during an intermediate focal length state.
Figure 4:
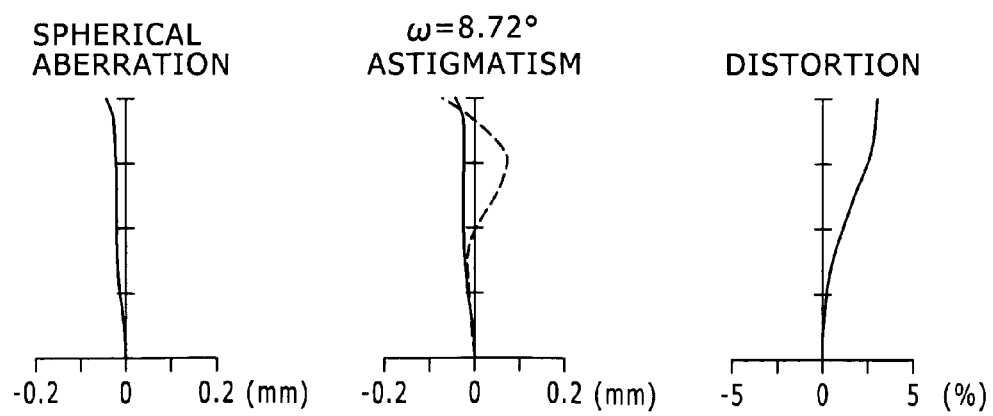
FIG. 4 is a graph showing a spherical aberration, an astigmatism, and a distortion measured during a telephoto end state.

Each of FIGS. 2 to 4 is a graph showing various aberrations in infinite focus state in the numerical example 1. FIG. 2 is a graph showing various aberrations obtained during the wide-angle end state (ω=30.03 degrees), FIG. 3 shows various aberrations obtained during the intermediate focal length state (ω=13.04 degrees), and FIG. 4 shows various aberrations obtained during the telephoto end state (ω=8.72 degrees).

In each of the aberration graphs, aberrations are measured with respect to d-line wavelength. A solid line and a dashed line in an astigmatism graph represent a sagittal image plane and a meridional image plane, respectively.

From the aberration graphs, it is understood that the numerical example 1 has a zoom ratio, as high as 3.8 times, and has the aberrations satisfactorily corrected and thus has superior image-forming performance, with a greater use of plastic lenses.

Figure 5:
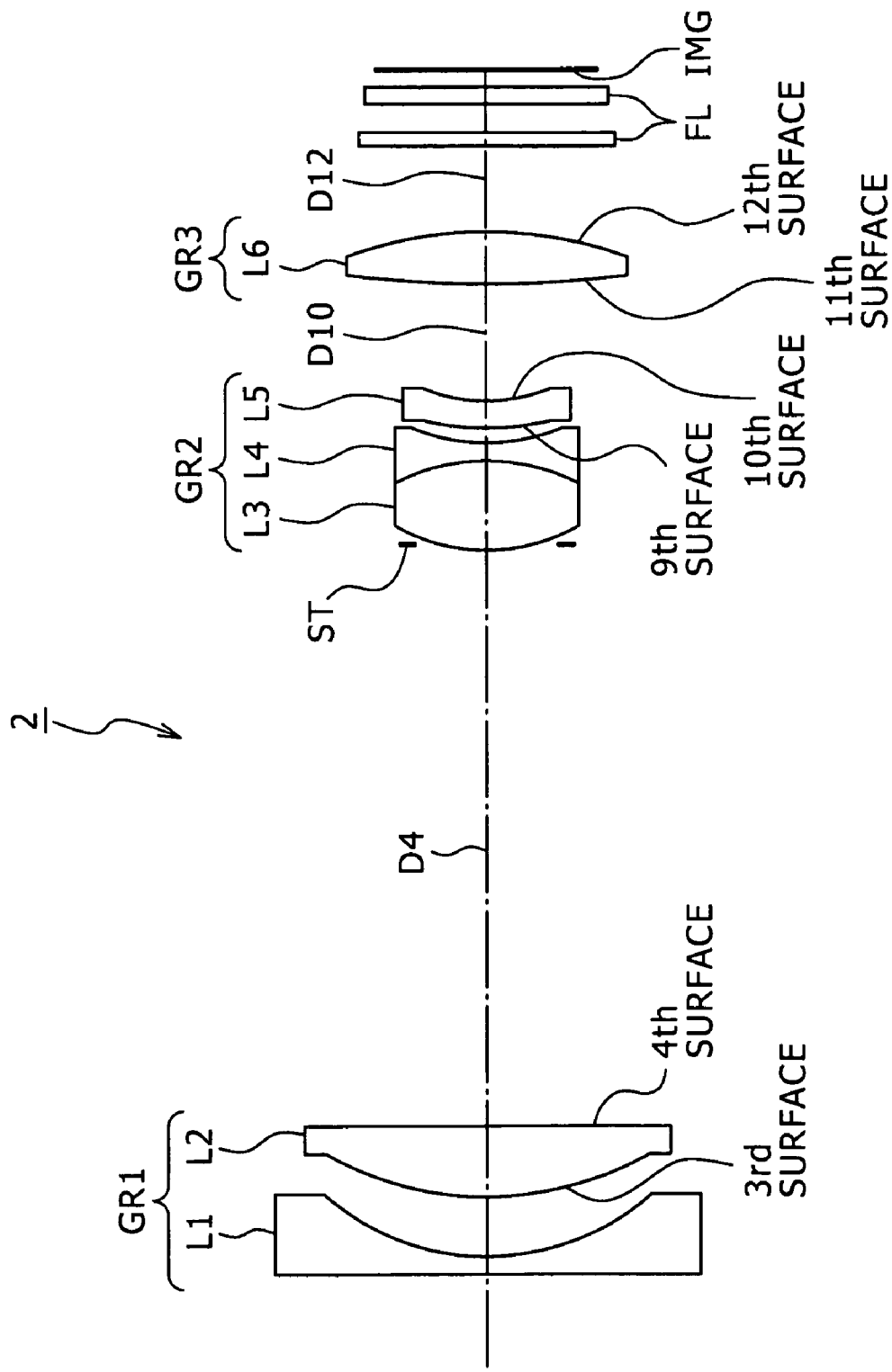
FIG. 5 is a diagram showing the lens construction of a zoom lens according to a second embodiment of the present invention.

FIG. 5 is a diagram showing the lens construction of a second embodiment 2 of the zoom lens according to an embodiment of the present invention. A zoom lens 2 is constructed by, in the following order from the object side, a first lens group GR1 having a negative power, a second lens group GR2 having a positive power, and a third lens group GR3 having a positive power. During zooming, all of the first to the third lens groups GR1 to GR3 are movable. On the wide-angle side (short focus), an interval between the first lens group GR1 and the second lens group GR2 is increased to decrease an interval between the second lens group and an imaging plane, thereby moving the principal point closer to the imaging plane and thus achieving the short focus. On the other hand, on the telephoto side (long focus), the interval between the first lens group GR1 and the second lens group GR2 is decreased to increase the interval between the second lens group and the imaging plane, thereby moving the principal point away from the imaging plane and thus achieving the long focus. Furthermore, by making the third lens group movable and thus by allowing the third lens group to absorb focal position variations at various angles of view, the high performance can be assured while miniaturization is achieved.

The first lens group GR1 includes by positioning, in the following order from the object side, a glass negative meniscus lens L1 having a concave surface facing the image side and a plastic positive meniscus lens L2 having a convex surface facing the object side and having both surfaces formed of aspherical surfaces. The second lens group GR2 includes by positioning, in the following order from the object side, an aperture stop ST, a cemented positive lens constructed of a biconvex glass positive lens L3 and a biconcave glass negative lens L4, and a plastic negative meniscus lens L5 having a convex surface facing the object side and having both surfaces formed of aspherical surfaces. The third lens group GR3 is constructed of a plastic positive meniscus lens L6 having a convex surface facing the image side and having both surfaces formed of aspherical surfaces. Furthermore, a filter FL such as a low-pass filter is disposed between the third lens group GR3 and an image plane IMG.

Table 6 shows F-numbers "FNO" and half-angles of view "ω" of a numerical example 2 in which specific values are applied to the zoom lens 2 according to the second embodiment, along with focal lengths "f".

In the zoom lens 2, both surfaces (the 3rd and the 4th surfaces) of the plastic-formed positive meniscus lens L2 of the first lens group GR1, both surfaces (the 9th and the 10th surfaces) of the plastic-formed negative meniscus lens L5 of the second lens group GR2, and both surfaces (the 11th and the 12th surfaces) of the plastic positive meniscus lens L6 constituting the third lens group GR3 are formed of aspherical surfaces. The 4th-, 6th-, 8th-, and 10th-order aspherical coefficients A, B, C, and D of these surfaces in the numerical example 2 are shown in Table 8, along with conic constants "κ".

TABLE 8

| SURFACE NUMBER | κ | A | B | C | D |
|---|---|---|---|---|---|
| 3 | 0.00000E+00 | −6.42621E−05 | −1.55689E−06 | −1.75209E−08 | −5.96159E−09 |
| 4 | 0.00000E+00 | −2.37013E−04 | 9.96187E−07 | −2.90732E−07 | −2.39427E−10 |
| 9 | 0.00000E+00 | −3.52901E−03 | −5.41464E−04 | 6.74261E−05 | −4.94870E−06 |
| 10 | 0.00000E+00 | −6.67733E−04 | −3.67845E−04 | 6.78896E−05 | −3.17563E−06 |
| 11 | 0.00000E+00 | 7.98351E−04 | −6.52446E−05 | 5.47636E−06 | −1.66487E−07 |
| 12 | 0.00000E+00 | 1.46386E−03 | −7.31221E−05 | 5.57682E−06 | −1.71755E−07 |

In the zoom lens 2, a surface interval D4 between the first lens group GR1 and the second lens group GR2, a surface interval D10 between the second lens group GR2 and the third lens group GR3, and a surface interval D12 between the third lens group GR3 and the filter FL vary during zooming from the wide-angle end state to the telephoto end state. The values of the respective intervals in the numerical example 2 during the wide-angle end state (f=6.35), the intermediate focal length state (f=12.56), and the telephoto end state (f=19.14) are shown in Table 9.

TABLE 6

| | f | | |
|---|---|---|---|
| | 6.35 | 12.56 | 19.14 |
| FNO | 2.86 | 3.98 | 5.09 |
| ω | 29.55 | 16.00 | 10.65 |

TABLE 9

| | f | | |
|---|---|---|---|
| | 6.35 | 12.56 | 19.14 |
| D4 | 18.945 | 6.255 | 1.381 |
| D10 | 4.260 | 10.294 | 15.738 |
| D12 | 2.922 | 2.309 | 2.170 |

Table 7 shows the data on optical elements constituting the zoom lens 2, in the numerical example 2.

The values corresponding to the conditional expressions (1) through (8) of the numerical example 2 are shown in Table 10.

TABLE 7

| SURFACE NUMBER | RADIUS OF CURVATURE | SURFACE INTERVAL | REFRACTIVE INDEX | ABBE NUMBER |
|---|---|---|---|---|
| 1 | 0.0000 | 0.600 | 1.61800 | 63.4 |
| 2 | 7.9837 | 2.114 | | |
| 3 | 12.5330 | 1.700 | 1.58300 | 29.2 |
| 4 | 25.5333 | 19.245 | | |
| APERTURE STOP | 0.0000 | −0.300 | | |
| 6 | 5.4098 | 2.800 | 1.83500 | 43.0 |
| 7 | −7.1239 | 0.591 | 1.72825 | 28.3 |
| 8 | 6.2129 | 0.600 | | |
| 9 | 7.7755 | 0.880 | 1.52470 | 56.2 |
| 10 | 6.8027 | 4.260 | | |
| 11 | −530.4451 | 1.650 | 1.52470 | 56.2 |
| 12 | −9.3280 | 2.922 | | |
| 13 | 0.0000 | 0.400 | 1.45847 | 67.8 |
| 14 | 0.0000 | 1.000 | | |
| 15 | 0.0000 | 0.500 | 1.56882 | 56.0 |
| 16 | 0.0000 | 0.600 | | |
| IMG | 0.0000 | 0.000 | | |

TABLE 10

| α | 3.0 |
|---|---|
| lw/(α·Y) | 3.65 |
| \|φP1/φ1\| | 0.50 |
| \|φP2/φ2\| | 0.08 |
| \|φP1/φt\| | 0.48 |
| \|φP2/φt\| | 0.13 |
| n1 | 1.61800 |
| ν1 | 63.4 |

Figure 6:
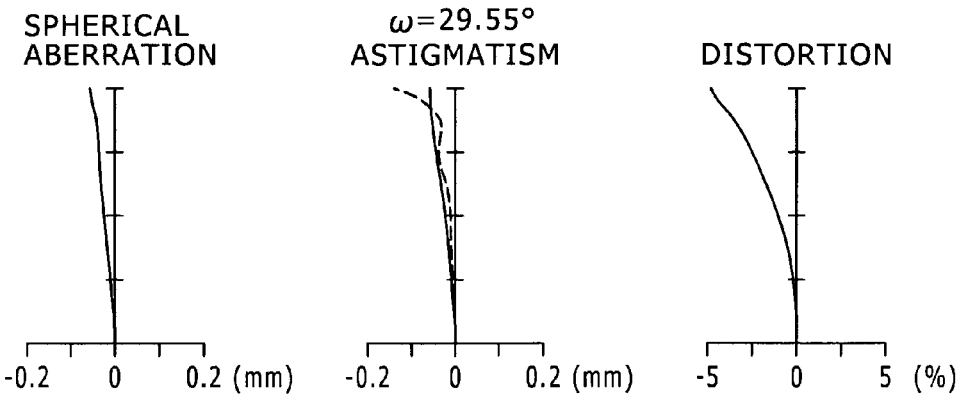
FIG. 6 is a graph showing, along with FIGS. 7 and 8, various aberrations of a numerical example 2 obtained by applying specific values to the second embodiment.
Figure 7:
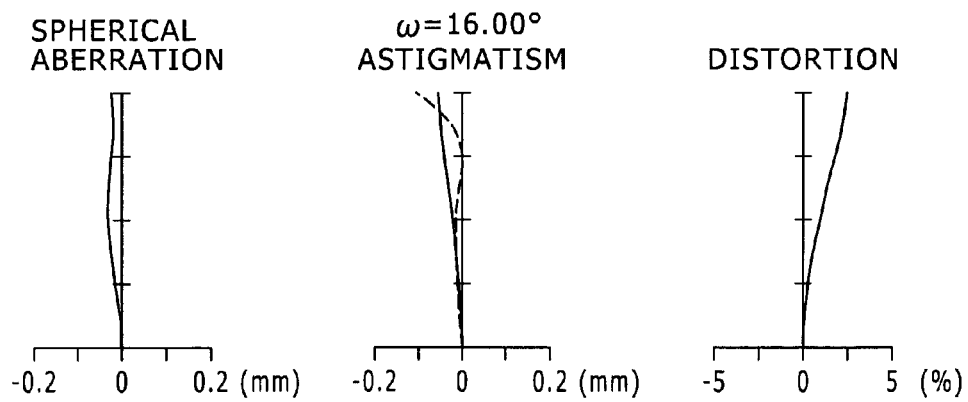
FIG. 7 is a graph showing a spherical aberration, an astigmatism, and a distortion measured during the intermediate focal length state.
Figure 8:
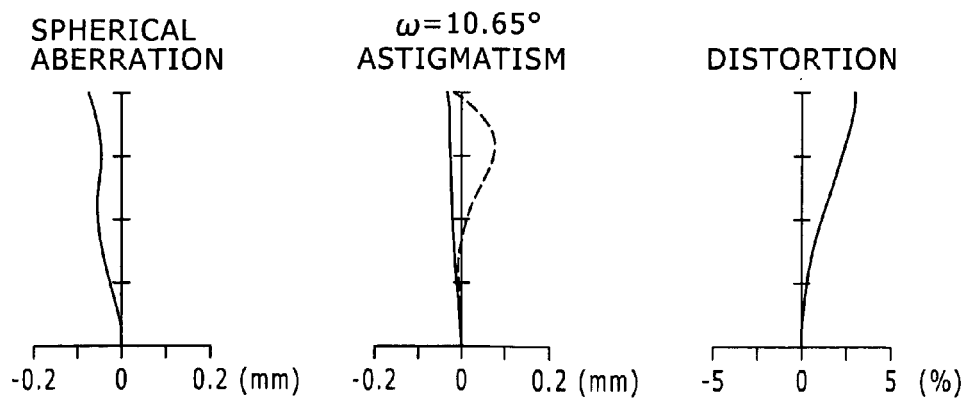
FIG. 8 is a graph showing a spherical aberration, an astigmatism, and a distortion measured during the telephoto end state.

Each of FIGS. 6 to 8 is a graph showing various aberrations in infinite focus state in the numerical example 2. FIG. 6 shows various aberrations obtained during the wide-angle end state (ω=29.55 degrees), FIG. 7 shows various aberrations obtained during the intermediate focal length state (ω=16.00 degrees), and FIG. 8 shows various aberrations obtained during the telephoto end state (ω=10.65 degrees).

In each of the above-mentioned aberration graphs, aberrations are measured with respect to d-line wavelength. A solid line and a dashed line in an astigmatism graph represent a sagittal image plane and a meridional image plane, respectively.

From the aberration graphs, it is understood that the numerical example 2 has a high zoom ratio, and has the aberrations satisfactorily corrected and thus has superior image-forming performance, with a greater use of plastic lenses.

Figure 9:
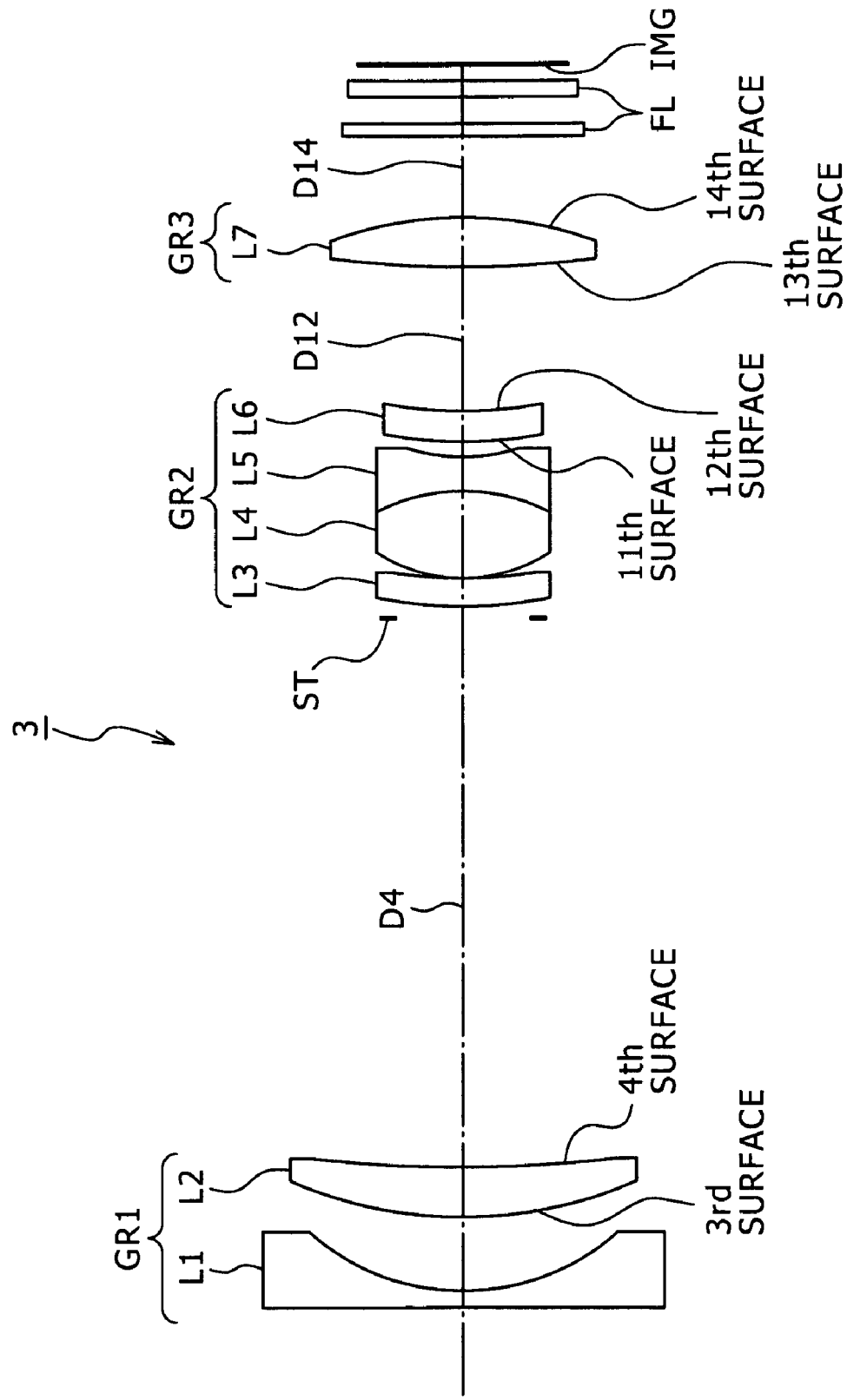
FIG. 9 is a diagram showing the lens construction of a zoom lens according to a third embodiment of the present invention.

FIG. 9 is a diagram showing the lens construction of a third embodiment 3 of the zoom lens according to an embodiment of the present invention. A zoom lens 3 is constructed by, in the following order from the object side, a first lens group GR1 having a negative power, a second lens group GR2 having a positive power, and a third lens group GR3 having a positive power. During zooming, all of the first to the third lens groups GR1 to GR3 are movable. On the wide-angle side (short focus), an interval between the first lens group GR1 and the second lens group GR2 is increased to decrease an interval between the second lens group and an imaging plane, thereby moving the principal point closer to the imaging plane and thus achieving the short focus. On the other hand, on the telephoto side (long focus), the interval between the first lens group GR1 and the second lens group GR2 is decreased to increase the interval between the second lens group and the imaging plane, thereby moving the principal point away from the imaging plane and thus achieving the long focus. Furthermore, by making the third lens group movable and thus by allowing the third lens group to absorb focal position variations at various angles of view, the high performance can be assured while miniaturization is achieved.

The first lens group GR1 includes by positioning, in the following order from the object side, a glass negative meniscus lens L1 having a concave surface facing the image side and a plastic positive meniscus lens L2 having a convex surface facing the object side and having both surfaces formed of aspherical surfaces. The second lens group GR2 includes by positioning, in the following order from the object side, an aperture stop ST, a glass positive meniscus lens L3 having a convex surface facing the object side, a cemented positive lens constructed of a biconvex glass positive lens L4 and a biconcave glass negative lens L5, and a plastic negative meniscus lens L6 having a convex surface facing the object side and having both surfaces formed of aspherical surfaces. The third lens group GR3 is constructed of a plastic positive lens L7 having a convex surface facing the image side and having both surfaces formed of aspherical surfaces. Furthermore, a filter FL such as a low-pass filter is disposed between the third lens group GR3 and an image plane IMG.

In this zoom lens 3 according to the third embodiment, the second lens group GR2 is constructed by positioning, in the following order from the object side, the positive glass lens L3, the positive glass lens (the cemented lens constructed of the positive glass lens L4 and the negative glass lens L5), and the negative plastic lens L6. By this construction, the plurality of lenses bear part of the positive power of the glass lens. As a result, the sensitivity to the relative decentration between the respective lenses in the second lens group GR2 can be suppressed, thereby making the assembling easy and the construction favorable for manufacture. Furthermore, by increasing the distance between the aperture stop ST and the plastic lens L6 in the second lens group GR2, the aspherical surfaces can be utilized effectively, thereby making the construction favorable for aberration correction.

Table 11 shows F-numbers "FNO" and half-angles of view "ω" of a numerical example 3 in which specific values are applied to the zoom lens 3 according to the third embodiment, along with focal lengths "f".

TABLE 11

| | f | | |
|---|---|---|---|
| | 6.35 | 13.45 | 20.92 |
| FNO | 2.80 | 4.05 | 5.30 |
| ω | 29.55 | 14.98 | 9.76 |

Table 12 shows the data on optical elements constituting the zoom lens 3, in the numerical example 3.

TABLE 12

| SURFACE NUMBER | RADIUS OF CURVATURE | SURFACE INTERVAL | REFRACTIVE INDEX | ABBE NUMBER |
|---|---|---|---|---|
| 1 | 0.0000 | 0.600 | 1.62041 | 60.3 |
| 2 | 7.4389 | 2.589 | | |
| 3 | 16.0265 | 1.700 | 1.58300 | 29.2 |
| 4 | 48.5052 | 19.498 | | |
| APERTURE STOP | 0.0000 | 0.100 | | |
| 6 | 11.9229 | 1.000 | 1.84666 | 23.8 |
| 7 | 12.2152 | 0.100 | | |
| 8 | 5.9316 | 3.068 | 1.83500 | 43.0 |
| 9 | −6.4249 | 1.196 | 1.72825 | 28.3 |
| 10 | 6.3650 | 0.644 | | |
| 11 | 24.5917 | 0.880 | 1.52470 | 56.2 |
| 12 | 18.5252 | 4.871 | | |
| 13 | 63.7441 | 1.650 | 1.52470 | 56.2 |
| 14 | −10.4807 | 2.605 | | |
| 15 | 0.0000 | 0.400 | 1.45847 | 67.8 |
| 16 | 0.0000 | 1.000 | | |
| 17 | 0.0000 | 0.500 | 1.56882 | 56.0 |
| 18 | 0.0000 | 0.600 | | |
| IMG | 0.0000 | 0.000 | | |

In the zoom lens 3, both surfaces (the 3rd and the 4th surfaces) of the plastic-formed positive meniscus lens L2 of the first lens group GR1, both surfaces (the 11th and the 12th surfaces) of the plastic-formed negative meniscus lens L6 of the second lens group GR2, and both surfaces (the 13th and the 14th surfaces) of the plastic positive meniscus lens L7 constituting the third lens group GR3 are formed of aspherical surfaces. The 4th-, 6th-, 8th-, and 10th-order aspherical coefficients A, B, C, and D of these surfaces in the numerical example 3 are shown in Table 13, along with conic constants "κ".

TABLE 13

| SURFACE NUMBER | K | A | B | C | D |
|---|---|---|---|---|---|
| 3 | 0.00000E+00 | 5.52632E−05 | −4.47801E−06 | 1.14446E−08 | 4.94698E−09 |
| 4 | 0.00000E+00 | −1.40723E−04 | −5.68029E−06 | 4.18709E−08 | 3.68421E−09 |
| 11 | 0.00000E+00 | −6.55553E−03 | −3.85862E−05 | −1.34483E−05 | 3.43626E−06 |
| 12 | 0.00000E+00 | −3.72742E−03 | 1.00610E−04 | 8.65670E−06 | 1.80242E−06 |

TABLE 13-continued

| SURFACE NUMBER | K | A | B | C | D |
|---|---|---|---|---|---|
| 13 | 0.00000E+00 | 4.30598E−04 | −1.67363E−04 | 1.25650E−05 | −3.06367E−07 |
| 14 | 0.00000E+00 | 1.02706E−03 | −1.93241E−04 | 1.36615E−05 | −3.19208E−07 |

In the zoom lens 3, a surface interval D4 between the first lens group GR1 and the second lens group GR2, a surface interval D12 between the second lens group GR2 and the third lens group GR3, and a surface interval D14 between the third lens group GR3 and the filter FL vary during zooming from the wide-angle end state to the telephoto end state. The values of the respective intervals in the numerical example 3 during the wide-angle end state (f=6.35), the intermediate focal length state (f=13.45), and the telephoto end state (f=20.92) are shown in Table 14.

TABLE 14

| | f | | |
|---|---|---|---|
| | 6.35 | 13.45 | 20.92 |
| D4 | 19.498 | 5.889 | 1.220 |
| D12 | 4.871 | 12.082 | 19.182 |
| D14 | 2.605 | 2.370 | 2.572 |

The values corresponding to the conditional expressions (1) through (8) of the numerical example 3 are shown in Table 15.

TABLE 15

| α | 3.3 |
|---|---|
| $lw/(\alpha \cdot Y)$ | 3.62 |
| $|\phi P1/\phi 1|$ | 0.46 |
| $|\phi P2/\phi 2|$ | 0.11 |
| $|\phi P1/\phi t|$ | 0.52 |
| $|\phi P2/\phi t|$ | 0.14 |
| n1 | 1.62041 |
| ν1 | 60.3 |

Figure 10:
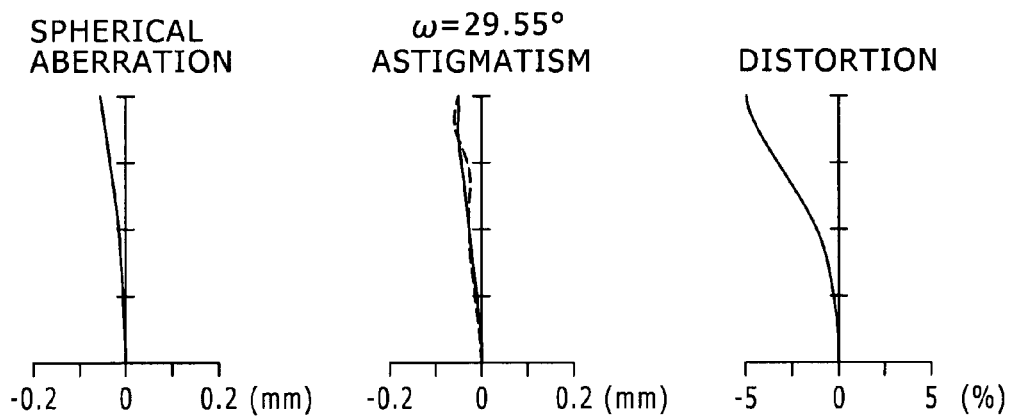
FIG. 10 is a graph showing, along with FIGS. 11 and 12, various aberrations of a numerical example 3 obtained by applying specific values to the third embodiment.
Figure 11:
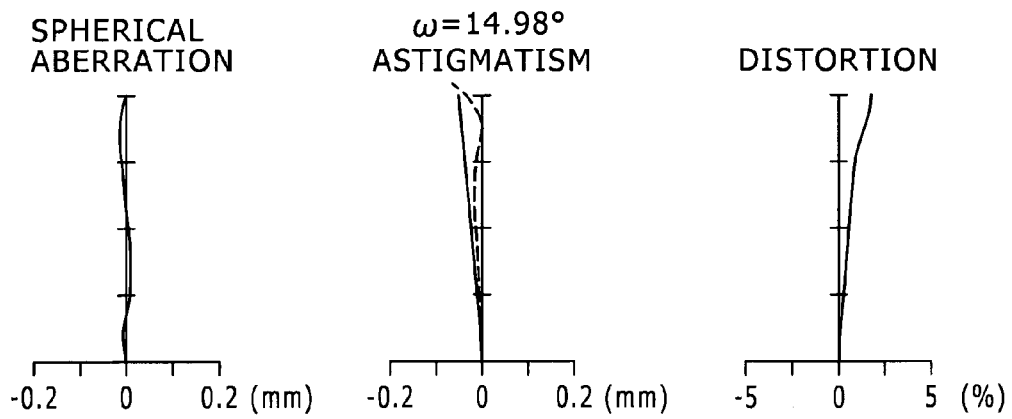
FIG. 11 is a graph showing a spherical aberration, an astigmatism, and a distortion measured during the intermediate focal length state.
Figure 12:
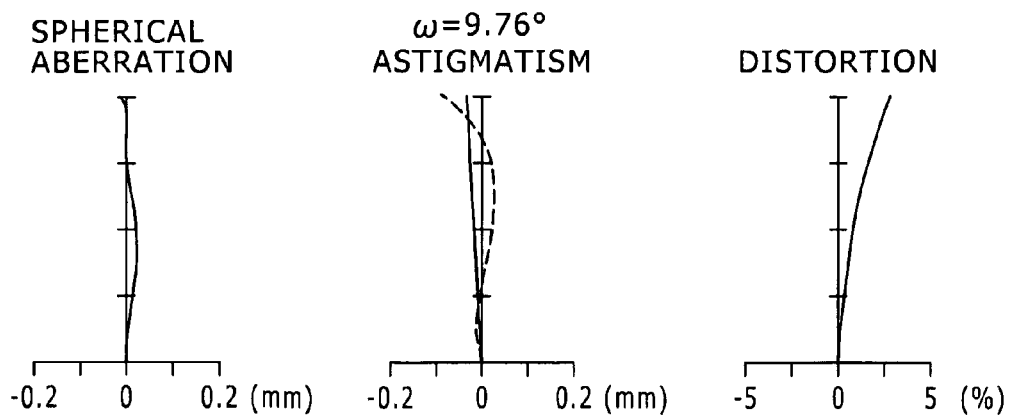
FIG. 12 is a graph showing a spherical aberration, an astigmatism, and a distortion measured during the telephoto end state.

Each of FIGS. 10 to 12 is a graph showing various aberrations in infinite focus state in the numerical example 3. FIG. 10 shows various aberrations obtained during the wide-angle end state (ω=29.55 degrees), FIG. 11 shows various aberrations obtained during the intermediate focal length state (ω=14.98 degrees), and FIG. 12 shows various aberrations obtained during the telephoto end state (ω=9.76 degrees).

In each of the above-mentioned aberration graphs, aberrations are measured with respect to d-line wavelength. A solid line and a dashed line in an astigmatism graph represent a sagittal image plane and a meridional image plane, respectively.

From the aberration graphs, it is understood that the numerical example 3 has a high zoom ratio, and has the aberrations satisfactorily corrected and thus has superior image-forming performance with a greater use of plastic lenses.

Figure 13:
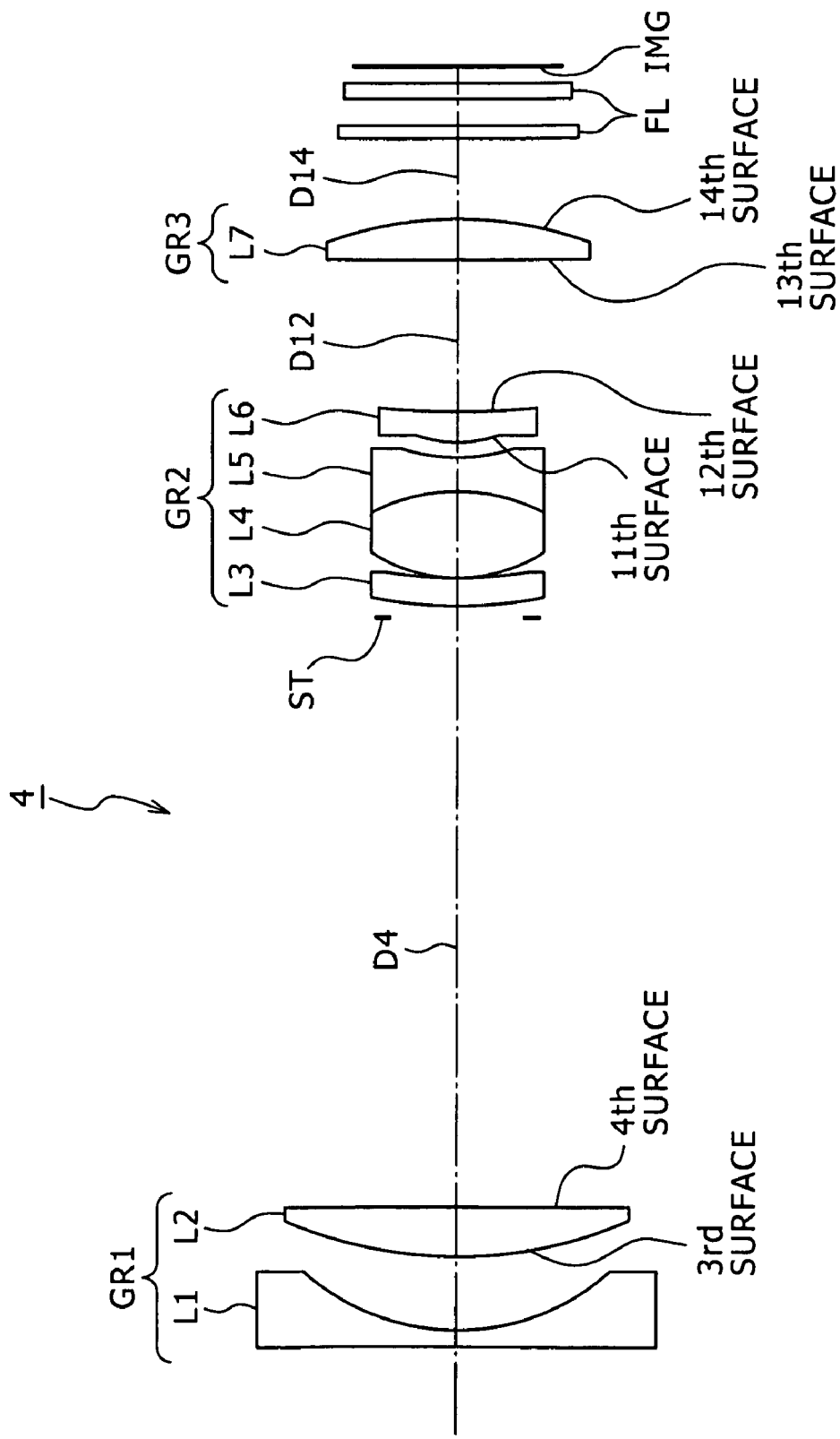
FIG. 13 is a diagram showing the lens construction of a zoom lens according to a fourth embodiment of the present invention.

FIG. 13 is a diagram showing the lens construction of a fourth embodiment 4 of the zoom lens according to an embodiment of the present invention. A zoom lens 4 is constructed by, in the following order from the object side, a first lens group GR1 having a negative power, a second lens group GR2 having a positive power, and a third lens group GR3 having a positive power. During zooming, all of the first to the third lens groups GR1 to GR3 are movable. On the wide-angle side (short focus), an interval between the first lens group GR1 and the second lens group GR2 is increased to decrease an interval between the second lens group and an imaging plane, thereby moving the principal point closer to the imaging plane and thus achieving the short focus. On the other hand, on the telephoto side (long focus), the interval between the first lens group GR1 and the second lens group GR2 is decreased to increase the interval between the second lens group and the imaging plane, thereby moving the principal point away from the imaging plane and thus achieving the long focus. Furthermore, by making the third lens group movable and by allowing the third lens group to absorb focal position variations at various angles of view, the high performance can be assured while miniaturization is achieved.

The first lens group GR1 includes by positioning, in the following order from the object side, a glass negative meniscus lens L1 having a concave surface facing the image side and a plastic positive meniscus lens L2 having a convex surface facing the object side and having both surfaces formed of aspherical surfaces. The second lens group GR2 includes by positioning, in the following order from the object side, an aperture stop ST, a glass positive meniscus lens L3 having a convex surface facing the object side, a cemented positive lens constructed of a biconvex glass positive lens L4 and a biconcave glass negative lens L5, and a plastic negative meniscus lens L6 having a convex surface facing the object side and having both surfaces formed of aspherical surfaces. The third lens group GR3 is constructed of a bicovex plastic positive lens L7 having both surfaces formed of aspherical surfaces. Furthermore, a filter FL such as a low-pass filter is disposed between the third lens group GR3 and an image plane IMG.

In this zoom lens 4 according to the fourth embodiment, the second lens group GR2 is constructed by positioning, in the following order from the object side, the positive glass lens L3, the positive glass lens (the cemented lens constructed of the positive glass lens L4 and the negative glass lens L5), and the negative plastic lens L6. By this construction, the positive power of the glass lens is distributed to a plurality of lenses. As a result, the sensitivity to the relative decentration between the respective lenses in the second lens group GR2 can be suppressed, thereby making the assembling easy and the construction favorable for manufacture. Furthermore, by increasing the distance between the aperture stop ST and the plastic lens L6 in the second lens group GR2, the aspherical surfaces can be utilized effectively, thereby making the construction favorable for aberration correction.

Table 16 shows F-numbers "FNO" and half-angles of view "ω" of a numerical example 4 in which specific values are applied to the zoom lens 4 according to the fourth embodiment, along with focal lengths "f".

TABLE 16

| | f | | |
|---|---|---|---|
| | 6.35 | 14.35 | 23.92 |
| FNO | 2.82 | 4.17 | 5.75 |
| ω | 29.55 | 14.08 | 8.56 |

Table 17 shows the data on optical elements constituting the zoom lens 4, in the numerical example 4.

TABLE 17

| SURFACE NUMBER | RADIUS OF CURVATURE | SURFACE INTERVAL | REFRACTIVE INDEX | ABBE NUMBER |
|---|---|---|---|---|
| 1 | 0.0000 | 0.600 | 1.64000 | 60.2 |
| 2 | 8.0826 | 2.718 | | |
| 3 | 16.5909 | 1.700 | 1.58300 | 29.2 |
| 4 | 49.6574 | 22.255 | | |
| APERTURE STOP | 0.0000 | 0.100 | | |
| 6 | 11.6970 | 1.000 | 1.92286 | 20.9 |
| 7 | 11.9641 | 0.100 | | |
| 8 | 5.9010 | 2.747 | 1.83500 | 43.0 |
| 9 | −6.9283 | 1.300 | 1.72825 | 28.3 |
| 10 | 6.1689 | 0.700 | | |
| 11 | 20.4847 | 0.880 | 1.52470 | 56.2 |
| 12 | 16.0271 | 4.960 | | |
| 13 | 105.7847 | 1.650 | 1.52470 | 56.2 |
| 14 | −10.6161 | 2.790 | | |
| 15 | 0.0000 | 0.400 | 1.45847 | 67.8 |
| 16 | 0.0000 | 1.000 | | |
| 17 | 0.0000 | 0.500 | 1.56883 | 56.0 |
| 18 | 0.0000 | 0.600 | | |
| IMG | 0.0000 | 0.000 | | |

In the zoom lens 4, both surfaces (the 3rd and the 4th surfaces) of the plastic-formed positive meniscus lens L2 of the first lens group GR1, both surfaces (the 11th and the 12th surfaces) of the plastic-formed negative meniscus lens L6 of the second lens group GR2, and both surfaces (the 13th and the 14th surfaces) of the plastic positive meniscus lens L7 constituting the third lens group GR3 are formed of aspherical surfaces. The 4th-, 6th-, 8th-, and 10th-order aspherical coefficients A, B, C, and D of these surfaces in the numerical example 4 are shown in Table 18, along with conic constants "κ".

TABLE 18

| SURFACE NUMBER | K | A | B | C | D |
|---|---|---|---|---|---|
| 3 | 0.00000E+00 | −4.60624E−06 | 1.33371E−06 | −2.02560E−07 | 5.38341E−09 |
| 4 | 0.00000E+00 | −1.61223E−04 | 6.12516E−07 | −1.90465E−07 | 4.87290E−09 |
| 11 | 0.00000E+00 | −5.92328E−03 | −2.40059E−04 | 3.70864E−05 | −1.27085E−06 |
| 12 | 0.00000E+00 | −3.23829E−03 | −1.17206E−04 | 5.55108E−05 | −2.21768E−06 |
| 13 | 0.00000E+00 | 5.50747E−04 | −1.56514E−04 | 1.23880E−05 | −3.00326E−07 |
| 14 | 0.00000E+00 | 1.15374E−03 | −1.84247E−04 | 1.36615E−05 | −3.19208E−07 |

In the zoom lens 3, a surface interval D4 between the first lens group GR1 and the second lens group GR2, a surface interval D12 between the second lens group GR2 and the third lens group GR3, and a surface interval D14 between the third lens group GR3 and the filter FL vary during zooming from the wide-angle end state to the telephoto end state. The values of the respective intervals in the numerical example 2 during the wide-angle end state (f=6.35), the intermediate focal length state (f=14.35), and the telephoto end state (f=23.92) are shown in Table 19.

TABLE 19

| | f | | |
|---|---|---|---|
| | 6.35 | 14.35 | 23.92 |
| D4 | 22.255 | 6.046 | 0.700 |
| D12 | 4.960 | 12.784 | 21.661 |
| D14 | 2.790 | 2.570 | 2.570 |

The values corresponding to the conditional expressions (1) through (8) of the numerical example 4 are shown in Table 20.

TABLE 20

| α | 3.8 |
|---|---|
| lw/(α · Y) | 3.39 |
| \|φP1/φ1\| | 0.47 |
| \|φP2/φ2\| | 0.09 |
| \|φP1/φt\| | 0.57 |
| \|φP2/φt\| | 0.16 |
| n1 | 1.64000 |
| ν1 | 60.2 |

Each of FIGS. 14 to 16 is a graph showing various aberrations in infinite focus state in the numerical example 4. FIG. 14 shows various aberrations obtained during the wide-angle end state (ω=29.55 degrees), FIG. 15 shows various aberrations obtained during the intermediate focal length state (ω=14.08 degrees), and FIG. 16 shows various aberrations obtained during the telephoto end state (ω=8.56 degrees).

In each of the aberration graphs, aberrations are measured with respect to d-line wavelength. A solid line and a dashed line in an astigmatism graph represent a sagittal image plane and a meridional image plane, respectively.

From the aberration graphs, it is understood that the numerical example 4 has a high zoom ratio, and has the aberrations satisfactorily corrected and thus has superior image-forming performance, with a greater use of plastic lenses.

Then, the image pickup apparatus according to an embodiment of the present invention will be described.

The image pickup apparatus includes a zoom lens, and an imaging device for converting an optical image formed by the zoom lens into an electrical signal.

The zoom lens is constructed by, in the following order from an object side, a first lens group having a negative power, a second lens group having a positive power, and a third lens group having a positive power. At least the first lens group and the second lens group are movable during a change from a wide-angle end state in which a focal length becomes shortest to a telephoto end state in which the focal length becomes longest. The first lens group is constructed of a glass lens having a negative power and a plastic lens having a positive power. The second lens group includes a single plastic lens having a negative power. The third lens group includes at least one plastic lens having a positive power. The following conditional expressions (1), (2), (3), (4), (5), and (6) are satisfied:

$$\alpha > 2.5; \quad (1)$$

$$lw/(\alpha \cdot Y) < 4.5; \quad (2)$$

$$|\phi P1/\phi 1| \leq 0.55; 4\phi \quad (3)$$

$$|\phi P2/\phi 2| \leq 0.3; \quad (4)$$

$$|\phi P1/\phi t| < 0.7; \text{ and} \quad (5)$$

$$|\phi P2/\phi t| < 0.4, \quad (6)$$

where

α is a zoom ratio (=focal length of a total system at a telephoto end/focal length of the total system at a wide-angle end);

φ1 is a power of the first lens group;

φP1 is a power of the plastic lens having positive power in the first lens group;

φ2 is a power of the second lens group;

φP2 is a power of the plastic lens having negative power in the second lens group;

φt is a power at the telephoto end of the total system;

lw is a total optical length at the wide-angle end; and

Y is a maximum image height.

As a result of this construction, an image pickup apparatus being small in size and having high image quality and high magnifying power can be obtained at low cost.

Figure 17:
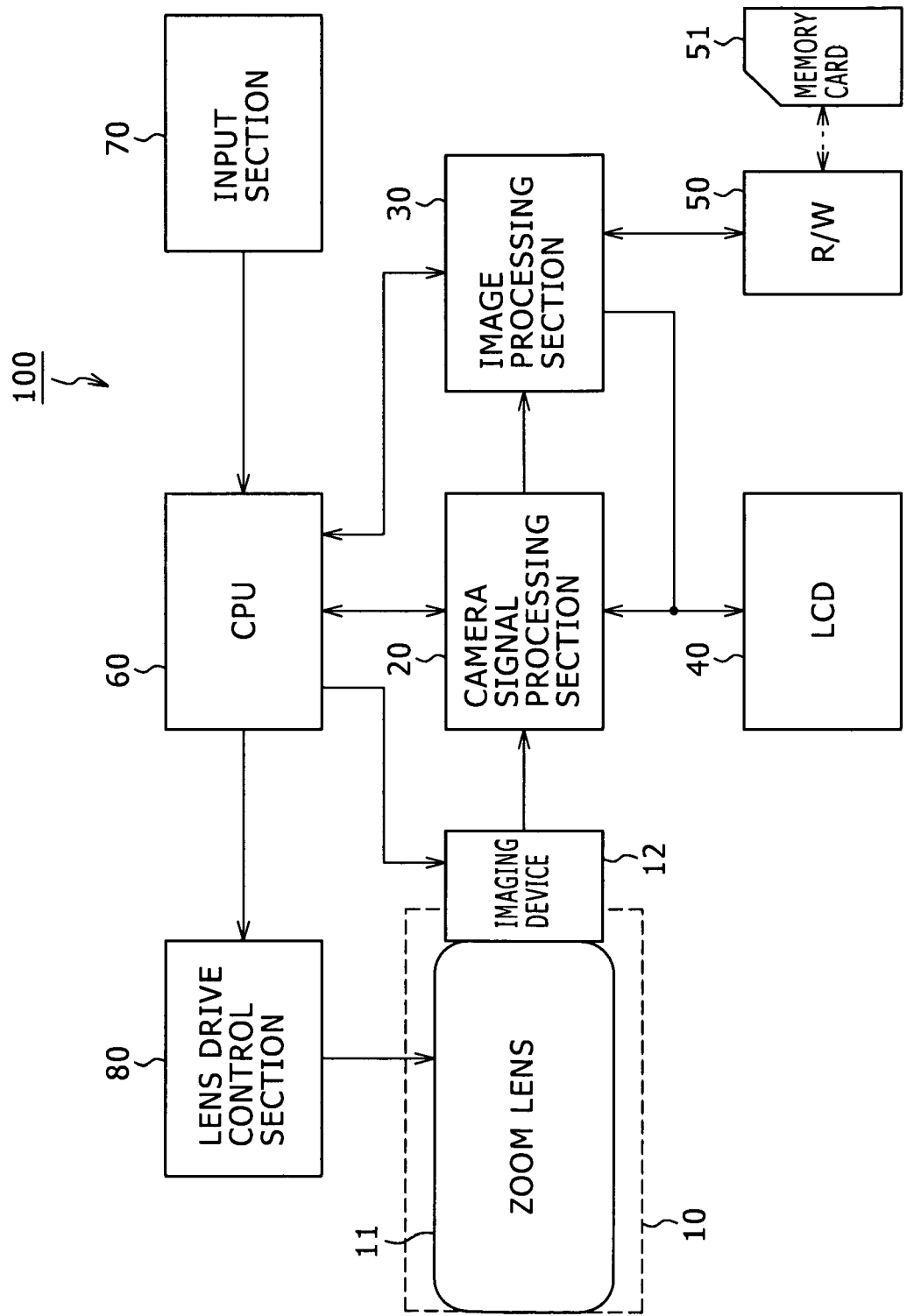
FIG. 17 is a block diagram showing an embodiment in which an image pickup apparatus according to an embodiment of the present invention is applied to a digital camera.

FIG. 17 is a block diagram showing a specific embodiment in which the image pickup apparatus is applied to a digital still camera.

A digital still camera 100 includes a camera block 10 performing an imaging function, a camera signal processing section 20 for performing signal processing such as analog-to-digital conversion of a captured image signal, an image processing section 30 for performing recording/playback processing for the image signal, an LCD (Liquid Crystal Display) 40 displaying a captured image and the like, a reader/writer (R/W) 50 for reading/writing from/to a memory card 51, a CPU 60 for controlling the whole apparatus, an input section 70 for input of operation by a user, and a lens drive control section 80 for controlling the driving of lenses within the camera block 10.

The camera block 10 has an optical system including a zoom lens 11 being an embodiment to which the present invention is applied, an imaging device 12 such as a CCD, a CMOS, and the like. As the zoom lens 11, the above-described zoom lenses 1 to 4 according to the embodiments of the present invention and the numerical examples 1 to 4, as well as any zoom lens into which the present invention is embodied in a mode other than the above-described embodiments can be used. The camera signal processing section 20 performs image processing such as conversion of an output signal from the imaging device 12 into a digital signal, noise removal, image quality correction, and conversion into luminance/color difference signals. The image processing section 30 performs compression encoding/decompression decoding processing for the image signal based on a predetermined image data format, conversion processing for data specifications such as resolution, and the like.

The memory card 51 includes a removable semiconductor memory. The R/W 50 writes image data encoded by the image processing section 30 to the memory card 51, or reads image data recorded on the memory card 51. The CPU 60 is a control processing section controlling various circuit blocks within the digital still camera, and controls the various circuit blocks on the basis of an instruction input signal and the like from the input section 70. The input section 70 includes, e.g., a shutter release button for performing shutter operation, mode selection switches for selecting operation modes, and the like, and outputs an instruction input signal responsive to user operation, to the CPU 60. The lens drive control section 80 controls motors (not shown), and the like, driving the lenses within the zoom lens 11 on the basis of a control signal from the CPU 60.

An operation of this digital still camera will be described below briefly.

During standby for image taking, under control by the CPU 60, an image signal captured in the camera block 10 is outputted to the LCD 40 via the camera signal processing section 20, for display as a camera-through image. Also, when an instruction input signal for zooming from the input section 70 is received, the CPU 60 outputs a control signal to the lens drive control section 80, and predetermined lenses within the zoom lens 11 are moved on the basis of control by the lens drive control section 80. Then, when the shutter(not shown) of the camera block 10 is released by an instruction input signal from the input section 70, the captured image signal is outputted from the camera signal processing section 20 to the image processing section 30 to be subjected to compression encoding processing for conversion into digital data of a predetermined data format. The converted data is outputted to the R/W 50, and written to the memory card 51.

It is noted that focusing is performed by the lens drive control section 80 causing predetermined lenses within the zoom lens 11 to move on the basis of a control signal from the CPU 60, e.g., when the shutter release button is depressed halfway down, all the way down for recording, or the like.

Furthermore, to reproduce image data recorded on the memory card 51, the R/W 50 reads predetermined image data from the memory card 51 responsive to control by the input section 70. After the image data is subjected to decompression decoding processing in the image processing section 30, an image signal for reproducing is outputted to the LCD 40. As a result, the reproduced image is displayed.

While a case where the image pickup apparatus is applied to a digital still camera has been described in the above embodiment, it may also be applied to other image pickup apparatuses such as video cameras, and the like.

Furthermore, the shapes and structures as well as the numerical values that have been referred to in the above description of the embodiments are provided merely as one example for illustrative purposes for ease of understanding of various embodiments for carrying out the present invention, and these embodiments are not to be construed as limiting the technical scope of the present invention.

What is claimed is:

1. A zoom lens comprising, in order from an object side:

a first lens group having a negative power;

a second lens group having a positive power; and a third lens group having a positive power, wherein at least the first lens group and the second lens group are movable during a change from a wide-angle end state in which a focal length becomes shortest to a telephoto end state in which the focal length becomes longest;

the first lens group is constructed of a glass lens and a plastic lens, the glass lens being positioned on the object side and having a negative power, the plastic lens being positioned on an image side and having a positive power;

the second lens group includes a single plastic lens having a negative power;

the third lens group includes at least one plastic lens having a positive power; and the following conditional expressions (1), (2), (3), (4), (5), and (6) are satisfied:

$$\alpha > 2.5; \tag{1}$$

$$lw/(\alpha \cdot Y) < 4.5; \tag{2}$$

$$|\phi P1/\phi 1| \leq 0.55; \tag{3}$$

$$|\phi P2/\phi 2| \leq 0.3; \tag{4}$$

$$|\phi P1/\phi t| < 0.7; \text{ and} \tag{5}$$

$$|\phi P2/\phi t| < 0.4, \tag{6}$$

where $\alpha$ is a zoom ratio (=focal length of a total system at a telephoto end/focal length of the total system at a wide-angle end);

$\phi 1$ is a power of the first lens group;

$\phi P1$ is a power of the plastic lens having a positive power in the first lens group;

$\phi 2$ is a power of the second lens group;

$\phi P2$ is a power of the plastic lens having a negative power in the second lens group;

$\phi t$ is a power at the telephoto end of the total system;

lw is a total optical length at the wide-angle end; and

Y is a maximum image height.

2. The zoom lens according to claim 1, wherein the following conditional expressions (7) and (8) are satisfied:

$$n1 < 1.62; \text{ and} \tag{7}$$

$$v1 > 55, \tag{8}$$

where n1 is a refractive index of the glass lens having a negative power in the first lens group; and v1 is an Abbe number of the glass lens having a negative power in the first lens group.

3. The zoom lens according to claim 1, wherein:

the second lens group includes by positioning, in order from the object side, an aperture stop, a first lens being a glass lens having a positive power, a second lens being a glass lens having a positive power, a third lens being a glass lens having a negative power, and a fourth lens being a plastic lens having a negative power, and the second lens and the third lens are cemented.

4. An image pickup apparatus comprising:

a zoom lens; and an imaging device for converting an optical image formed by the zoom lens into an electrical signal, wherein the zoom lens is constructed by, in order from an object side, a first lens group having a negative power, a second lens group having a positive power, and a third lens group having a positive power, and wherein at least the first lens group and the second lens group are movable during a change from a wide-angle end state in which a focal length becomes shortest to a telephoto end state in which the focal length becomes longest;

the first lens group is constructed of a glass lens having a negative power and a plastic lens having a positive power;

the second lens group includes a single plastic lens having a negative power;

the third lens group includes at least one plastic lens having a positive power; and the following conditional expressions (1), (2), (3), (4), (5), and (6) are satisfied:

$$\alpha > 2.5; \tag{1}$$

$$lw/(\alpha \cdot Y) < 4.5; \tag{2}$$

$$|\phi P1/\phi 1| \leq 0.55; \tag{3}$$

$$|\phi P2/\phi 2| \leq 0.3; \tag{4}$$

$$|\phi P1/\phi t| < 0.7; \text{ and} \tag{5}$$

$$|\phi P2/\phi t| < 0.4, \tag{6}$$

where $\alpha$ is a zoom ratio (=focal length of a total system at a telephoto end/focal length of the total system at a wide-angle end);

$\phi 1$ is a power of the first lens group;

$\phi P1$ is a power of the plastic lens having a positive power in the first lens group;

$\phi 2$ is a power of the second lens group;

$\phi P2$ is a power of the plastic lens having a negative power in the second lens group;

$\phi t$ is power at the telephoto end of the total system;

lw is a total optical length at the wide-angle end; and

Y is a maximum image height.

* * * * *